No. 774,549. PATENTED NOV. 8, 1904.
C. BAESE.
PHOTOGRAPHIC PROCESS FOR THE REPRODUCTION OF PLASTIC OBJECTS.
APPLICATION FILED MAY 17, 1902.
NO MODEL. 3 SHEETS—SHEET 1.
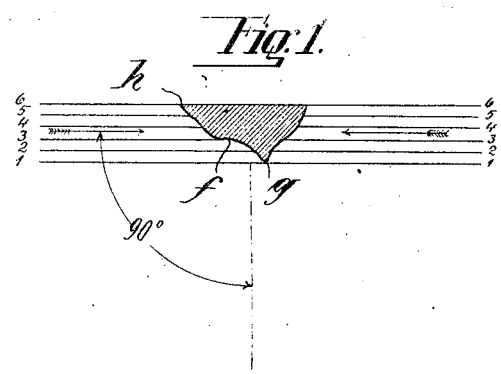
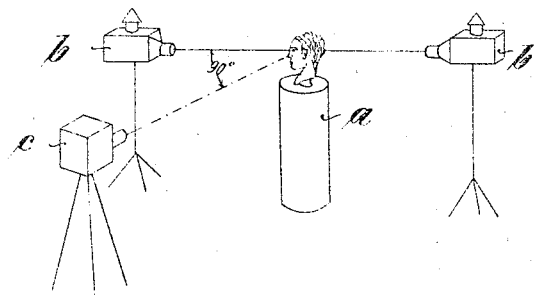
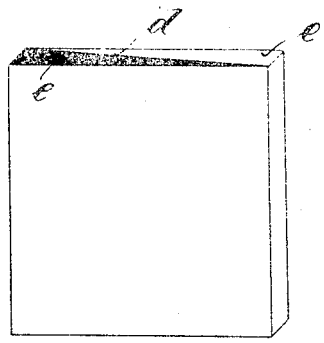 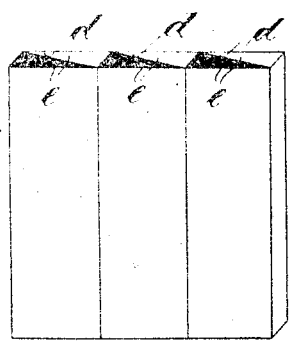
WITNESSES:
H. M. Avery
W. Harrison
INVENTOR
Carlo Baese
BY
ATTORNEYS No. 774,549. PATENTED NOV. 8, 1904.
C. BAESE.
PHOTOGRAPHIC PROCESS FOR THE REPRODUCTION OF PLASTIC OBJECTS.
APPLICATION FILED MAY 17, 1902.
NO MODEL. 3 SHEETS—SHEET 2.
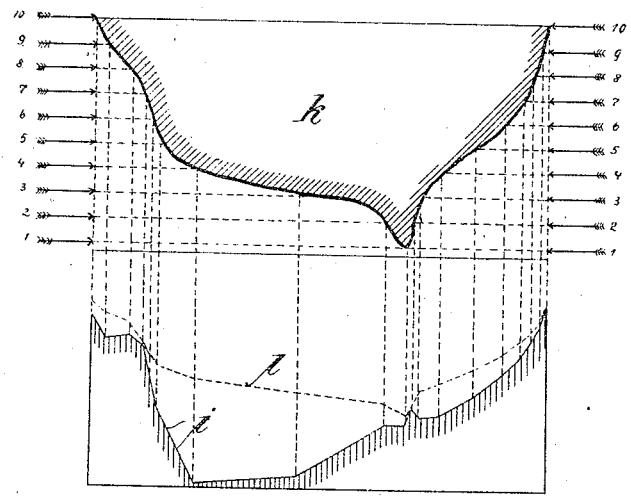
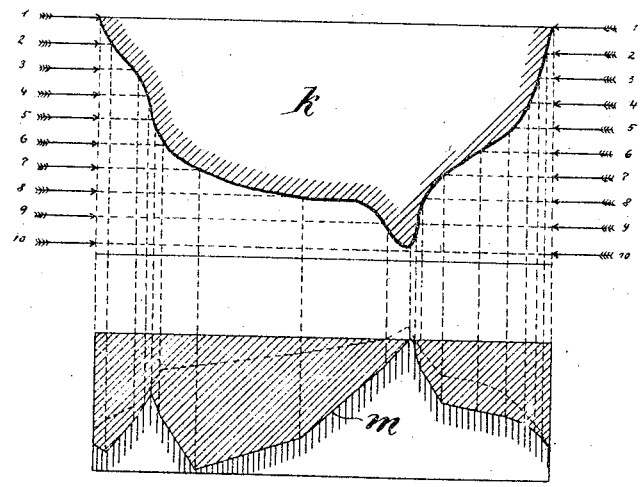
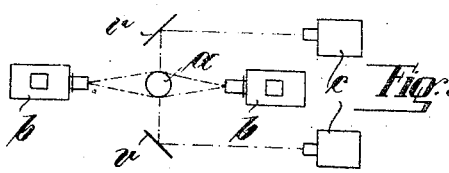
WITNESSES:
INVENTOR
Carlo Baese
BY
ATTORNEYS.

No. 774,549. PATENTED NOV. 8, 1904.
C. BAESE.
PHOTOGRAPHIC PROCESS FOR THE REPRODUCTION OF PLASTIC OBJECTS.
APPLICATION FILED MAY 17, 1902.
NO MODEL. 3 SHEETS—SHEET 3.

WITNESSES:
W. M. Avery
W. Harrison

INVENTOR
Carlo Baese
BY
ATTORNEYS

No. 774,549. Patented November 8, 1904.

UNITED STATES PATENT OFFICE.

CARLO BAESÉ, OF BERLIN, GERMANY.

PHOTOGRAPHIC PROCESS FOR THE REPRODUCTION OF PLASTIC OBJECTS.

SPECIFICATION forming part of Letters Patent No. 774,549, dated November 8, 1904.

Application filed May 17, 1902. Serial No. 107,763. (No specimens.)

*To all whom it may concern:*

Be it known that I, CARLO BAESE, a subject of the King of Prussia, Emperor of Germany, and a resident of Berlin, in the Kingdom of Prussia, in the German Empire, have invented a new and useful Improvement in Photographic Processes for the Reproduction of Plastic Objects, of which the following is a full, clear, and exact description.

My invention relates to improvements in photographic processes for producing plastic imitations or representations of objects of all kinds; and the purpose of my improvements is to obtain a set of photographic plates or films which in superposition will so modify the light passing therethrough that all modulations of light other than those due to the differences in relief will be neutralized. If, therefore, such a set of plates be copied on suitably-prepared gelatin and subsequently treated with water or other suitable substance, an exact imitation in relief of the object photographed will be obtained.

In carrying out my invention I photograph the object to be reproduced, hereinafter called the "original," in a light graduated in the direction of the axis of the lens of the camera and in proportion to the relief of said object or parts thereof and then repeat the exposure on another plate or film in homogeneous light or in light graduated in inverse proportion to the relief of said object. I then prepare a diapositive of one of said negatives, and this diapositive and the other negative form the desired set of plates.

For the purpose of better explaining my invention I describe the same below with reference to the accompanying drawings, in which—

Figure 7:
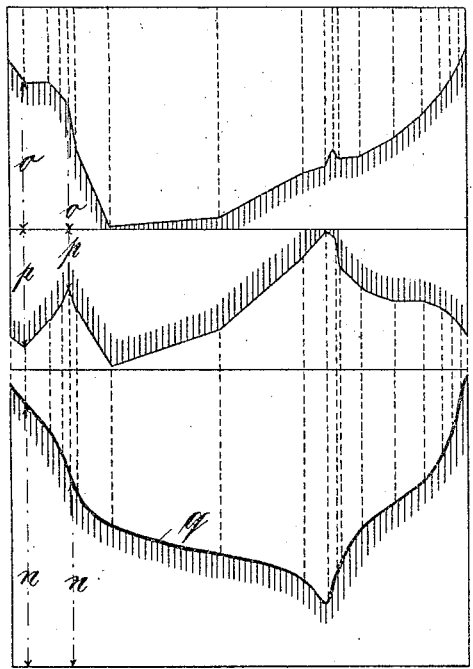
Figure 8:
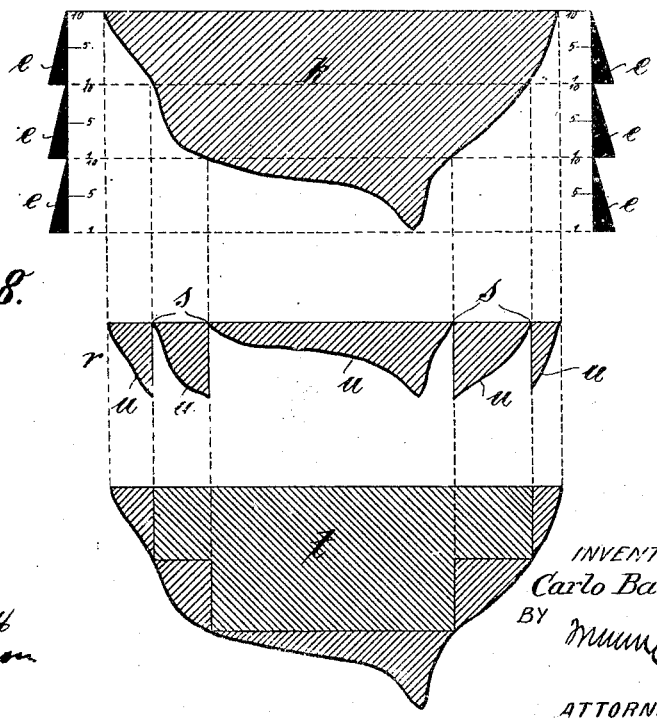

Figure 1 shows the direction of the illuminating-rays of light with regard to the original and to the camera when photographing said original, the numerals 1 to 6 representing the graduation or duration of the exposure of the light. Fig. 2 is a perspective view showing the position of the illuminating-lamps when photographing a bust to be reproduced in profile relief. Fig. 3 shows a perspective view of a light-filter used to graduate the light. Fig. 4 is a similar view of a light-filter adapted to graduate the light for illuminating the original in zones. Fig. 5 is a diagram showing the distribution of light and shade in one of the negatives; Fig. 6, a similar diagram representing the distribution of light and shade in the second negative. Fig. 7 represents the distribution of light and shade obtained by superposing the negative shown in Fig. 5 and the diapositive of the other negative. Fig. 8 is a diagram showing (*a*) the manner of illuminating the original in sections, (*b*) the gelatin sections after expansion, and (*c*) the gelatin sections fastened to a stepped support, while Fig. 9 represents another suitable manner of arranging the projection-lamps and camera.

Assuming it is desired to produce a profile relief of a bust, I illuminate back and front of the latter with light graduated in the direction of the axis of the camera-lens, as indicated in Fig. 1 by the parallel lines and the numerals 1 to 6. I then photograph the bust *a*, Fig. 2, illuminated in this manner, the illuminating-lamps *b* and photographic camera *c* occupying the position shown in Fig. 2. In order to graduate the light of the illuminating-lamps, I employ light-filters. For the present purpose the filter shown in Fig. 3 is suitable, which consists of a rectangular glass vessel divided into two triangular apartments by a diagonal wall, one of which is filled with a colored and the other one with a colorless liquid. I do not limit myself, however, to this particular mechanism for graduating the light, for obviously the same results may be accomplished in other ways without departing from the spirit of my invention.

When the light is graduated in such a manner that the parts of the original nearest to the camera are less illuminated than the more removed parts, as indicated in Fig. 1 by the numerals 1 to 6, the latter or more strongly illuminated parts will exercise a stronger actinic action on the photographic plate than the less removed parts. For example, the point *f*, Fig. 1, of the original will appear darker on the negative than the point *g* and the point *h* darker than the point *f*. The negative produced in this manner would not, however, alone influence the light in such a manner that the sensitized gelatin exposed thereunder when expanded will be an exact plastic representation of the original, because the surface of the original reflects more or less light during the photographic exposure, according to the angle in which the illuminating-rays fall thereon. In other words, the unevenness of the original produces a distribution of light and shade which bears no proportion to the relief of the original. Moreover, the different colors of the original exercise different actinic actions on the sensitized plate, so that those parts of the original which were less strongly illuminated during the exposure, owing to their color, may produce darker shades than other differently-colored parts which were more strongly illuminated. The shades of the negative are therefore dependent on three factors:

First. Owing to the graduated illumination of the object the parts nearest to the camera are less strongly illuminated than the more removed parts, so that the latter possess greater actinic properties. The distribution of lights and shadows in the negative produced by this graduation of the illuminating-light is alone useful for the purposes of my invention.

Second. Any surface on which the light falls at a right angle will possess greater actinic power than any surface of the same size on which the light falls at an acute angle. The distribution of light and shade produced by this factor is not in proportion to the relief of the original.

Third. The various colors of the original exercise different actinic powers, which are also not in proportion to the relief of the original and must accordingly be neutralized.

The distribution of shade in a negative for an infinitely-small zone of the original may be represented by the curve $i$ in Fig. 5, which may be easily calculated when, for the sake of clearness, it is assumed that at the particular zone the original has the section shown at $k$. The illumination of the original during the exposure of this negative is represented in Fig. 5 by the arrows 1 to 10, the parts farther removed from the camera being more strongly illuminated than the less removed parts.

On comparing the curve $i$ with the dotted line $l$, which latter represents the shape of the original at the zone in question, it will be seen that the distribution of light in this negative differs very essentially from the shape of the model at the zone in question.

When a second photograph of the model is taken in oppositely-graduated light, as indicated by the figures 1 to 10 in Fig. 6, the distribution of light in this second negative for the same zone of the original as before can be represented by the curve $m$ in Fig. 6. From one of the two negatives—for example, from the second—I now make a diapositive in known manner. The distribution of light and shade in this diapositive will be in inverse proportion to that of the second negative and can therefore be graphically represented by the cross-lined side of the curve $m$ in Fig. 6. As already mentioned, this diapositive, Fig. 6, and the first negative, Fig. 5, form the desired set of plates or the like. If now the constituents of this set are placed on each other, the lights and shades will be added together in the manner shown in Fig. 7. In this figure the distances $n$ at each of the points indicated by dotted lines will always be equal to the sum of the distances $o$ and $p$. As, however, the distances $o$ can be supposed to represent the shade intensities of the negative at the points in question and the distances $p$ the shade intensities of the diapositive, the curve $q$ will represent the sum of the shade intensities of the superposed negative and positive. The curve $q$ conforms exactly with the shape of the original at the zone in question. As a consequence sensitized gelatin of the kind usually employed for making reliefs exposed under the set will be so chemically affected that the mass when expanded will be an exact copy of the original in relief. It is clear, therefore, that during the exposure of the sensitized gelatin under the superposed negative and positive those factors in the latter which were produced during the exposure of the negatives in the camera by the unevenness and color of the original are neutralized. The desired result can also be obtained when one of the two negatives is taken in homogeneous—that is, in non-graduated—light. In this case a set of plates is also obtained, which when superposed neutralizes the distributions of light and shade occasioned by the color and unevenness of the original, although in this case the variations in the shade intensities occasioned by the relief of the original are not always augmented, as in the previous case.

Instead of illuminating the original during the exposure in the camera with light graduated across the whole width thereof, as done in the exposures represented in Figs. 5 to 7, I may illuminate the original in sections. For this purpose the filter shown in Fig. 4 can be used. This threefold graduation of light at the zone $k$ is graphically represented in Fig. 8, $e\ e$ being the light-filters and the numerals 1 5 10 representing the graduation of the light of the lamps $b$ effected by these filters. I then take a second photograph with oppositely-graduated light-zones. As in the first case, I make a diapositive of one of the negatives. On exposing sensitized gelatin under a set consisting of such a diapositive and negative the light will so act thereon that when expanded it assumes the shape shown at $r$ in Fig. 8. Every part $r$ is naturally of annular form in plan, because the original during the exposure of the negatives in the camera is illuminated from both sides with registering zones of light, and the camera is arranged at right angles to the direction of the illuminating-rays. If now these gelatin rings r are separated along the lines s, they can be fixed on the support t, which is so stepped that the surfaces u of the rings are continuous, as shown in Fig. 8.

In taking the photographs I may graduate the light any desired number of times. According as more graduations are adopted, the number of gelatin rings of the kind shown at r in Fig. 8 is increased. It is therefore possible by choosing a suitable number of sections to obtain any desired height of relief of the plastic reproduction formed by separating and properly arranging the rings.

In order to economize space, I may arrange the illuminating-lamps h and camera c in the manner shown in Fig. 9. The original a is in this case photographed on opposite sides, so that on placing the two gelatin halves together a full relief—for example, a bust—is obtained. The light reflected by the model is reflected by mirrors v toward the cameras c. It is, namely, quite indifferent what way the rays take as long as the photographs represent the original as seen from a point at right angles or approximately at right angles to the illuminating-rays, as diagrammatically shown in Fig. 1.

It is not necessary for the photographs to be taken in a room in which, except for the illuminating-lamps, no light is admitted, as stray light does not act injuriously, but may even help to diminish defects in the distribution of the light. By means of this process everything is neutralized which remains unaltered when taking both photographs—that is, not only the distributions of light and shade due to the color and unevenness of the original, but also those due to defects in the illumination.

For the positive or one of the negatives I prefer to use a film or a plate with detachable surface, so as to avoid the thickness of the glass plate between the negative and the prepared gelatin and to avoid any indistinctness. In some cases, however, this very indistinctness of outline may prove desirable from an artistic point of view. Further, I may also first prepare a copy of the negative and positive on any suitable material and to any scale and then copy this on the prepared substance.

What I claim, and desire to secure by Letters Patent of the United States, is—

1. The process herein described for reproducing plastic objects, which consists in preparing a photographic negative of the object to be produced in a light graduated in proportion to the prominence of the surface thereof, preparing the photographic negative of said object in a differently-distributed light, preparing a diapositive of one of said negatives, copying the diapositive and the uncopied negative on a sensitized mass capable of producing a relief, and finally developing said mass so as to reproduce the form of the original.

2. The process herein described for the reproduction of plastic objects, which consists in preparing in a light graduated in proportion to the prominence of the surface of the object a photographic negative thereof, preparing a photographic negative of said object in a line graduated in inverse proportion to the light as first graduated, preparing a diapositive of one of said negatives, copying the diapositive and the uncopied negative on a sensitized mass capable of producing a relief, and developing said mass so as to produce the form of the original.

3. The process herein described for the reproduction of plastic objects, which consists in preparing in a light graduated in proportion to the prominence of sections of the surface of the object to be produced, a photographic negative of said object, preparing a photographic negative of said object in a differently-distributed light, preparing a diapositive of one of said negatives, copying said diapositive and the uncopied negative on a sensitized mass capable of producing a relief, and developing said sensitized mass so as to reproduce the form of the original object.

4. The process herein described of reproducing plastic objects, which consists in preparing in a light graduated in proportion to the prominence of the sections of the surface of said object a photographic negative of said object, preparing a photographic negative in a light graduated in inversed proportion to the light as first graduated as aforesaid, preparing a diapositive of one of said negatives, copying said diapositive and the uncopied negatives on a sensitized mass capable of producing a relief, and developing said mass, substantially as described.

In testimony whereof I have signed my name to this specification in the presence of two subscribing witnesses.

CARLO BAESE.

Witnesses:
 HENRY HASPER,
 WOLDEMAR HAUPT.